United States Patent [19]

Smolik

[11] Patent Number: 4,858,407
[45] Date of Patent: Aug. 22, 1989

[54] LATERAL STABILIZER FOR WALL

[76] Inventor: Robert A. Smolik, 670 W. Seventh St., St. Paul, Minn. 55102

[21] Appl. No.: 44,983

[22] Filed: May 1, 1987

[51] Int. Cl.[4] .............................................. E04B 2/60
[52] U.S. Cl. ........................................ 52/481; 52/241; 403/350; 403/392
[58] Field of Search ................ 52/241, 287, 288, 481, 52/483, 716–718, 730–733, 762, 238.1, 667, 490; 182/178; 403/292, 297, 350

[56] References Cited

U.S. PATENT DOCUMENTS

| 616,895 | 1/1899 | Carroll | 403/292 |
|---|---|---|---|
| 2,071,673 | 2/1937 | Whitlock | 52/507 |
| 2,958,403 | 11/1960 | Robertson | 52/241 |
| 3,562,970 | 2/1971 | Schwartz | 52/36 |
| 3,736,714 | 6/1973 | Brenner | 52/300 |
| 4,037,788 | 7/1977 | Riley | 239/207 |
| 4,128,979 | 12/1978 | Price | 52/241 |
| 4,177,968 | 12/1979 | Chapman | 249/211 |
| 4,448,004 | 5/1984 | Thorsell | 52/481 |
| 4,478,022 | 10/1984 | Wilkinson et al. | 52/509 |
| 4,614,502 | 9/1986 | Nelson | 446/119 |
| 4,653,142 | 3/1987 | Upton | 16/115 |

FOREIGN PATENT DOCUMENTS

| 2725921 | 12/1978 | Fed. Rep. of Germany | 403/292 |
|---|---|---|---|
| 692666 | 8/1965 | Italy | 182/178 |

Primary Examiner—John E. Murtagh
Attorney, Agent, or Firm—Burd, Bartz & Gutenkauf

[57] ABSTRACT

A wall construction framework and stabilizer bar to stabilize a wall. A wall framework is comprised of a plurality of wall studs assembled in vertical relationship with major side members having linearly aligned openings. Each opening is preferably curved and has a length greater than the width. A linear stabilizing bar is installed in the openings of the wall stud. The bar has a cross sectional profile with a length greater than the width. The cross sectional width and length are less than the width and length of the wall stud openings so that the bar is easily inserted through the openings. The cross sectional length of the bar is greater than the width of the wall stud openings such that when the bar is inserted through the wall stud openings, it can be axially rotated to a point of being rigidly jammed and secured with respect to the wall stud openings to hold adjacent wall studs relatively rigid with respect to one another.

19 Claims, 2 Drawing Sheets

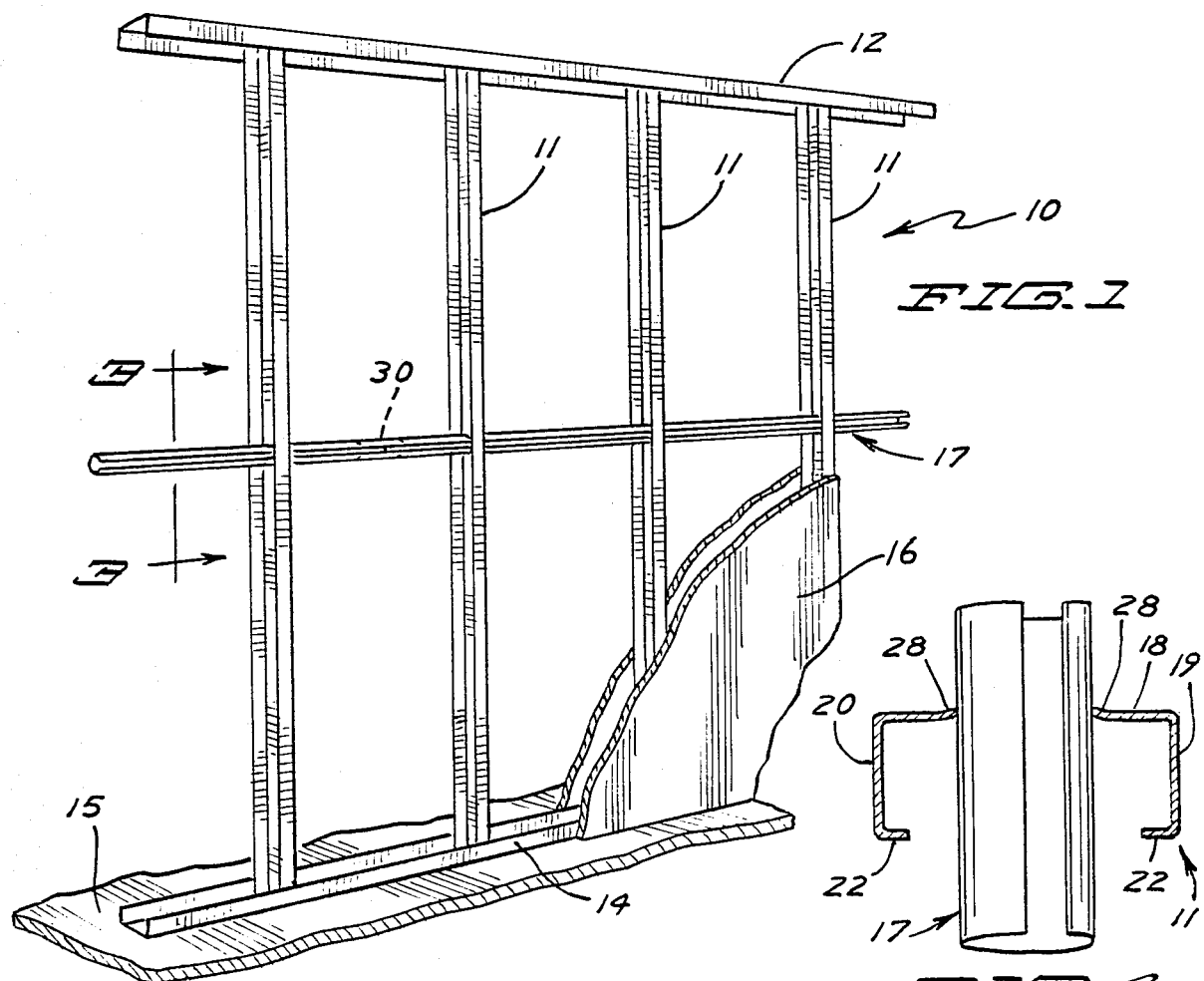
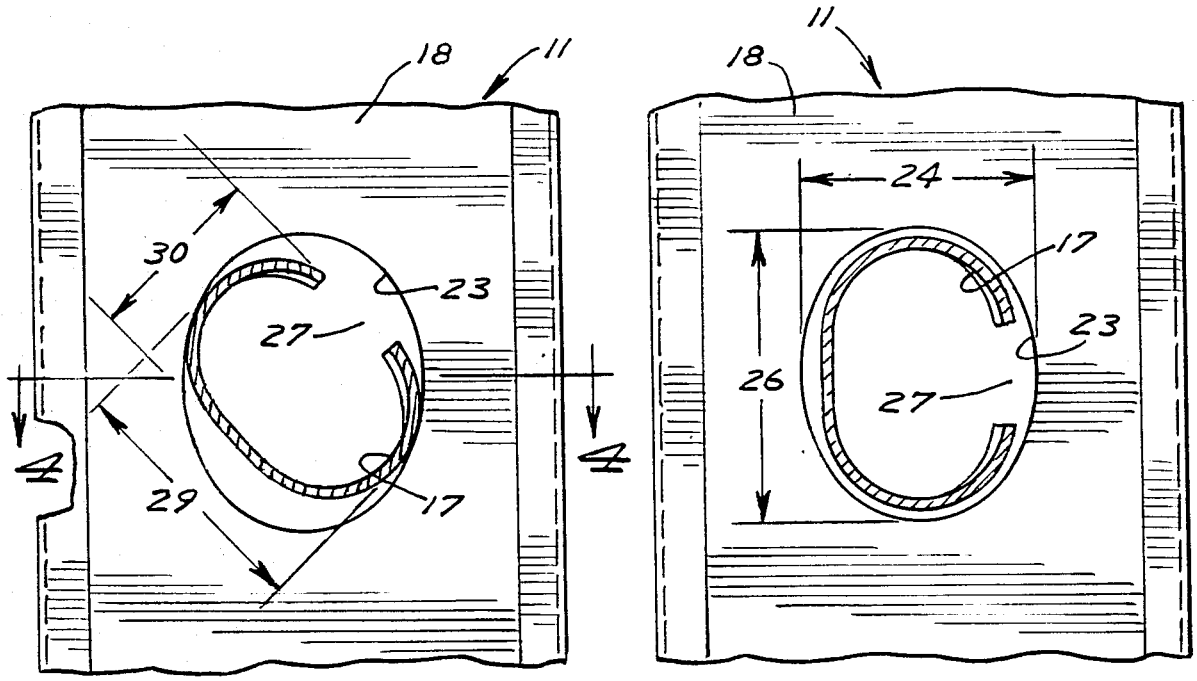

LATERAL STABILIZER FOR WALL

BACKGROUND OF THE INVENTION

In wall construction, tall walls are formed of a framework of long metal wall studs that are secured at upper and lower ends with respect to ceiling and floor structure, and preferably intermediately stabilized. Without an intermediate connection the wall studs tend to sway independently. This compromises the structural integrity of the framework and renders more difficult the application of standard wall siding. Accordingly, various means are provided for stabilizing the erected wall framework on particularly tall walls through intermediate connection of adjacent wall studs. As always, due to construction costs, the speed at which the construction worker accomplishes the task of stabilizing the wall framework is important in controlling costs.

SUMMARY OF THE INVENTION

The invention pertains to a lateral wall stabilizer usable in construction of tall walls ranging upward from approximately 14 feet. Elongate wall studs are erected in parallel relationship secured at top and bottom ends by usual construction techniques such as channel shaped runners or track. Each wall stud has a generally C-shaped profile with a major side surface facing adjacent wall studs. The side surfaces have parallel, linearly aligned openings with a width dimension and a length dimension that is greater than the width dimension. The wall studs are interconnected by a linear stabilizing bar. The stabilizing bar has a cross sectional profile with a width dimension and a length dimension that is greater than the width dimension. The width and length dimensions of the bar are respectively less than the width and length dimensions of the openings in the wall studs. The length dimension of the stabilizing bar cross section is greater than the width dimension of the wall stud openings. The stabilizing bar is easily inserted through the adjacent openings in the wall studs with the length and width dimensions parallel to those of the openings. Once installed with respect to the wall studs the stabilizing bar is rotated about its longitudinal axis to a point of jamming relationship with respect to the edges forming the openings in the wall studs. The cross sectional profile of the stabilizing bar can be resilient whereby the bar is held in place under tension, or the bar can be rigid and cause local deformation of the edges of the holes in the wall studs to stay in place in jammed relationship with respect to the wall stud. The stabilizing bar can be formed of sections that are held together by tubular coupling members or connectors telescopically and frictionally inserted in adjacent ends of stabilizing bar sections.

IN THE DRAWINGS

FIG. 1 is a perspective view of an erected wall framework according to wall construction of the present invention;

FIG. 2 is an enlarged side elevational view partly in section showing a stabilizing bar inserted through an opening in one of the wall studs of FIG. 1 with cross section the length and width dimensions parallel to those of the wall stud opening;

FIG. 3 is a side elevational view similar to that of FIG. 2 showing the stabilizing bar with the cross section length dimension in canted relationship to that of the opening and in jammed relationship to be held securely with respect to the vertical wall stud;

FIG. 4 is an enlarged view partially in section showing a portion of the wall stud and stabilizing bar of FIG. 3 taken along the line 4—4 thereof;

DESCRIPTION OF A PREFERRED EMBODIMENT

Figure 5:
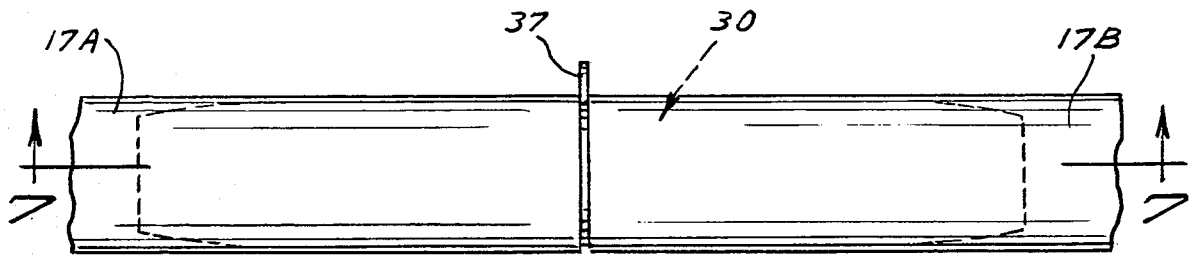
FIG. 5 is a side elevational view of a connector according to the invention effective to connect adjacent ends of adjacent stabilizing bar sections.

Referring to the drawings, there is shown in FIG. 1 a wall construction framework indicated generally at 10 comprised as a plurality of parallel upright elongate metal wall studs 11 assembled in coplanar relationship to an upper channel or construction track 12 by usual and preferred construction techniques. The lower ends of the wall studs 11 are assembled in a lower channel shaped construction track 14 fixed by suitable means to a floor 15 preparatory to installation of a wall surface partially shown at 16. The wall studs 11 are relatively elongate, for example, fourteen feet. It is desirable to stabilize them by connection of one to the next at an intermediate location and inhibit swaying of the wall to facilitate further construction. For this purpose a stabilizing or anchoring bar 17 is connected to the wall studs 11 to form a more composite and rigid structure.

As shown in FIG. 4, each of the wall studs 11 is of the generally C-shaped variety having a major side member or surface 18, perpendicular end members 19, 20 and inwardly extended lips 22 parallel to the side member 18 forming a channel.

In the uniform parallel relationship of FIG. 1, the major channel of each wall stud faces the side opposite the channel of the next wall stud. As best shown in FIGS. 3 and 4, each wall stud 11 has an eccentric anchoring opening 23 in the major side member 18. A segment of stabilizing bar 17 is accommodated in each opening 23. Anchoring opening 23 is rounded and generally oval having a width dimension indicated at 24 in FIG. 2 and a length dimension indicated at 26 which is greater than the width dimension. The openings 23 in studs 11 are linearly aligned and in parallel relationship. As shown in FIG. 2, the maximum length dimension is vertically oriented and the width dimension is perpendicular to it, or horizontal, although other orientations for these dimensions could be assumed.

Stabilizing bar 17 has an eccetric cross sectional profile and is trained through the openings 23 of the wall studs 11. Bar 17 has an interrupted or rounded C-shaped profile with a longitudinal sidewall space or gap 27. Space or gap 27 permits some degree of resiliency or inward deflectability of the cross sectional profile of anchoring bar 17. The anchoring bar 17 has a cross-sectional length dimension indicated at 29 in FIG. 3 and a cross-sectional width dimension indicated at 30. The width dimension is at right angles to and less than the length dimension. The length and width dimensions 29, 30 of the anchoring bar 17 are less than the corresponding dimensions 26, 24 of the anchoring openings 23. This permits easy insertion of the anchoring bar 27 through the anchoring openings 23 of the wall studs 11 as shown in FIG. 2 with the length and width dimensions of the stabilizing bar and anchoring opening 23 in parallel relationship. The length dimension 29 of the stabilizing bar 17 is greater than the width dimension 24 of the anchoring opening 23. The stabilizing bar 17 is rotated about its longitudinal axis a limited distance before it jams upon the side edges of openings 23. This occurs when the extremeties of the cross sectional profile interrupt the edges defining the anchoring opening 23. The stabilizing bar 17 is rotated axially to a point where the length dimension intercepts the corresponding dimension of the opening 23. Upon additional rotational force in the same direction it is held fast with respect to the opening 23. It can be held in place by a contraction of the cross sectional dimension of the anchoring member 17 thereby placing spring tension against the contracted edges of the opening 23. Alternatively, it can be held in place by imposing a localized deformation of the edge of the opening 23. The wall studs 11 frequently are formed of a relatively thin wall steel such that deformation locally will occur upon imposition of moderate pressure. As shown in FIG. 4, a localized deformation 28 occurs at the contacted edges of the opening 23. This is effective to hold the anchor bar 17 in place. The anchor bar 17 is held in place with respect to each adjacent stud 11 thereby anchoring or securing the composite wall framework.

Figure 6:
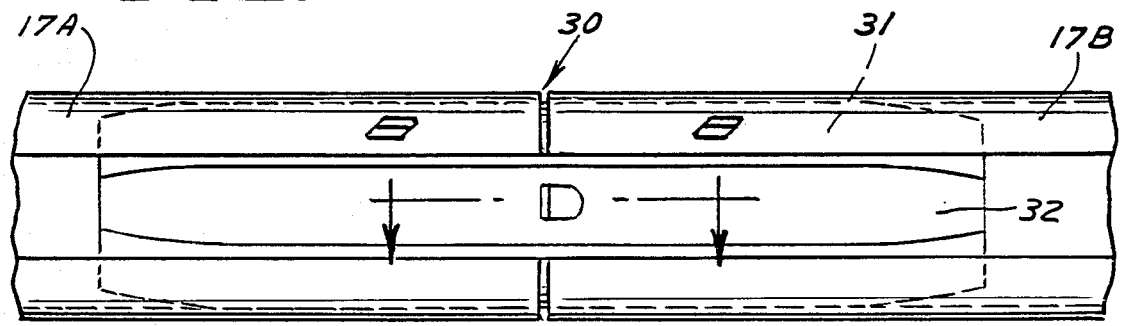
FIG. 6 is a side elevational view of the connector and stabilizing bar sections of FIG. 5 rotated 90 degrees.
Figure 7:
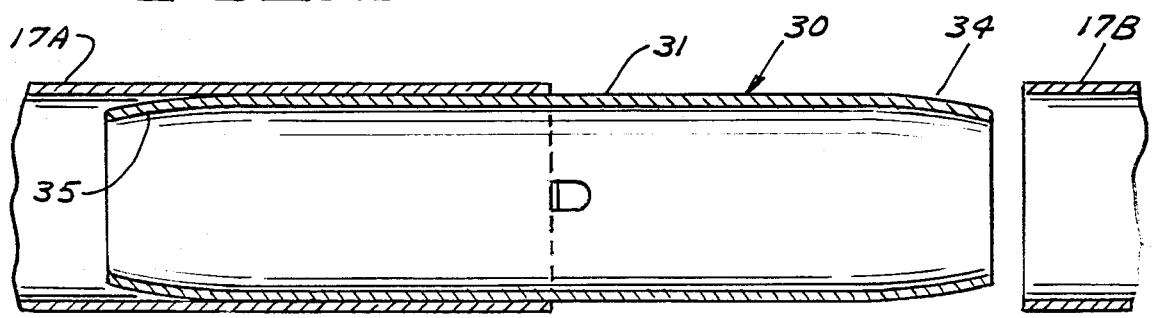
FIG. 7 is an enlarged sectional view of a portion of the connector and stabilizing bar sections of FIG. 5 taken along the line 7—7 thereof showing one stabilizing bar section removed from the connector.
Figure 8:
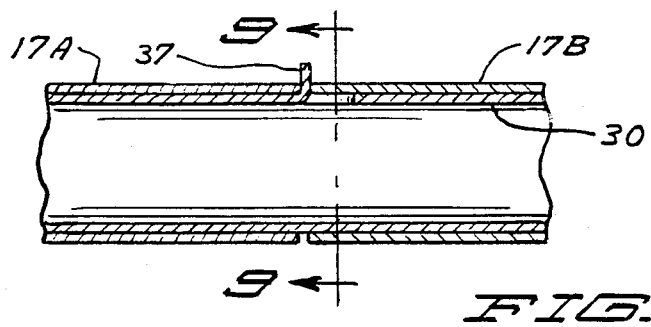
FIG. 8 is an enlarged sectional view of a portion of the connector and stabilizing bar section of FIG. 6 taken along the line 8—8 thereof.
Figure 9:
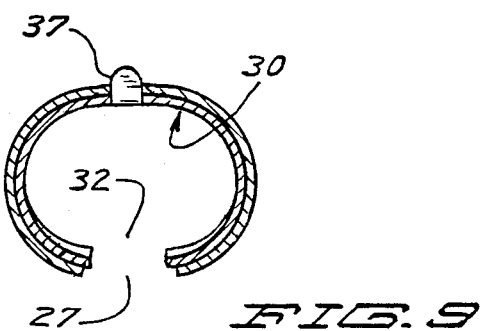
FIG. 9 is an enlarged sectional view of a portion of the stabilizing bar section and connector of FIG. 8 taken along the line 9—9 thereof.

Anchor bar 17 is comprised of a plurality of linear sections or members joined by connectors or coupling members to produce a desired length. As shown in FIGS. 5 through 9, anchor bar sections 17A and 17B are connected by a connector 30. Connector 30 has a tubular oval or C-shaped body 31 with a longitudinal peripheral opening or slit 32 forming confronting longitudinal edges. The central portion of body 31 has a cross sectional profile corresponding to that of anchor bar 17 but slightly smaller so as to fit snugly within the achor bar 17 in a close friction-fit relationship. Ends 34, 35 of connector 30 are tapered or reduced in cross sectional dimension to facilitate insertion into an end of an anchor bar section to the point where the central portion of the connector is installed in the interior of the section. A stop member or tab 37 extends radially outward from the mid portion of the body portion 31 at approximately the center of the length of connector 30. Tab 37 abuts the end edges of the anchor bar sections 17A, 17B to inhibit further movement along the body 30. Stop member 37 is also useful in disassembly of the anchor members 17A, 17B.

In the use of the invention, a wall framework is erected by parallel elongate wall studs assembled in parallel relationship and having linearly aligned parallel mounting openings. An anchor bar of the correct length is formed by assembly of a plurality of anchor bar sections 17A, 17B using connectors 30. The anchor bar is trained through the mounting openings in the wall studs with the major length dimension of the anchor bar parallel to that of the mounting openings. Once established in the wall studs the anchor bar is rotated about its longitudinal axis to a point where the extremeties of the bar intercept the edges of the mounting opening. Further rotation jams the bar with respect to the openings and holds them in place. Particularly high walls may require more than one anchor bar. Once stabilized, the appropriate wall covering can be installed on the wall framework.

While there has been shown and described a preferred embodiment of the invention, it will be apparent to those skilled in the art that certain changes and deviations can be had without departing from the scope and spirit of the invention.

The embodiments of the invention in which an exclusive property or privilege is claimed are defined as follows:

1. Wall construction comprising:
   a plurality of elongate wall studs assembled in parallel relationship with flat facing side members having linearly aligned parallel openings, each opening having a width dimension and a length dimension greater than the width dimension;
   an elongate linear stabilizing bar passing through the openings of the wall studs, said bar having a cross-sectional profile with a width dimension and a length dimension greater than the width dimension, the width and length dimensions being less that the width and length dimensions of the openings in the wall studs respectively, whereby the stabilizing bar is inserted through the openings in the wall studs;
   the length dimension of the stabilizing bar being greater than the width dimension of the wall stud openings;
   said stabilizing bar having gradually curved portions between extremities of said length and width dimensions and said openings having a profile with a gradually curving portion so that said stabilizing bar is relatively fixed with respect to the wall stud openings by being axially rotated in the wall stud openings to a point of jamming relationship between the stabilizing bar and the wall studs to hold the wall studs relatively rigid with respect to one another.

2. The wall construction of claim 1 wherein: said wall stud openings are oval.

3. The wall construction of claim 2 wherein: the major axes of the ovals are parallel to the longitudinal axes of the wall studs.

4. The wall construction of claim 3 wherein: the stabiling bar is a tubular member having a side wall with a longitudinal linear split.

5. The wall construction of claim 3 wherein: said stabilizing bar has a C-shaped profile.

6. The wall construction of claim 5 wherein: said stabilizing bar is comprised of first and second linear sections and a coupling member connecting the first and second sections.

7. The wall construction of claim 6 wherein: said coupling member has a C-shaped profile corresponding to the that of the stabilizing bar with reduced dimension end portions for telescopic engagement with ends of the stabilizing bar.

8. The wall construction of claim 7 wherein: said member has a radially extended tab proximate the mid-portion thereof abutting end edges of the first and second sections of the stabilizing bar.

9. The wall construction of claim 1 wherein: said stabilizing bar includes a plurality of tubular sections, and a plurality of coupling members interconnecting the tubular sections.

10. The wall construction of claim 9 wherein: said tubular sections of the stabilizing bar are open ended, each coupling member having an outside dimension slightly less than the inside dimension of the tubular members, said coupling members having ends telescopically engaged in adjacent ends of tubular sections to interconnect the sections.

11. The wall construction of claim 9 wherein: said coupling members have reduced dimension ends to facilitate insertion into ends of tubular sections.

12. The wall construction of claim 11 wherein: said coupling members have a C-shaped cross-sectional profile.

13. The wall construction of claim 12 wherein: said tubular sections and coupling members are generally oval in cross-sectional profile.

14. The wall construction of claim 13 wherein: each said coupling member has a radially extended tab proximate the mid-portion thereof abutting end edges of adjacent tubular sections.

15. The wall construction of claim 14 including: first track means connecting the upper ends of the wall studs, and second track means connecting the lower ends of the wall studs.

16. Stabilized wall construction comprising:
a plurality of wall construction members with forward faces assembled in coplanar relationship; said members having linearly aligned eccentric anchoring openings;
an elongate linear stabilzing bar installed in said openings, said stabilizing bar having an eccentric cross-sectional profile with a greater dimension less than a greatest dimension of the anchoring openings and more than a smallest dimension of the anchoring openings, said stabilizing bar being gradually curved on opposite sides between points defining said greatest dimension and points defining a least dimension so that said stabilizing bar is relatively fixed with respect to the anchoring openings by being rotated about its longitudinal axis to a position of jamming relationship with the edges of the anchoring openings to stabilize the construction members with respect to one another.

17. The wall construction of claim 16 wherein: said stabilizing bar is comprised of a plurality of stabilizing bar sections and a plurality of connector members connecting the stabilizing bar sections.

18. The wall construction of claim 17 wherein: said stabilizing bar sections being tubular sections, said connector members having ends telescopically inserted in the ends of the tubular members for interconnection of the tubular members.

19. The wall construction of claim 18 wherein: each tubular member has a longitudinal interruption along the length thereof.

* * * * *